US009244722B2

(12) United States Patent
Burgess et al.

(10) Patent No.: US 9,244,722 B2
(45) Date of Patent: Jan. 26, 2016

(54) TRANSACTIONAL UPDATING IN DYNAMIC DISTRIBUTED WORKLOADS

(75) Inventors: George M. Burgess, Hursley (GB); Paul Johnson, Hampshire (GB); Ian J. Mitchell, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 403 days.

(21) Appl. No.: 13/520,887

(22) PCT Filed: Dec. 23, 2010

(86) PCT No.: PCT/EP2010/070631
§ 371 (c)(1),
(2), (4) Date: Jul. 6, 2012

(87) PCT Pub. No.: WO2011/083056
PCT Pub. Date: Jul. 14, 2011

(65) Prior Publication Data
US 2012/0284723 A1    Nov. 8, 2012

(30) Foreign Application Priority Data

Jan. 11, 2010  (EP) .................................... 10150461

(51) Int. Cl.
*G06F 9/46*     (2006.01)
*G06F 17/00*    (2006.01)
*G06F 11/20*    (2006.01)
*G06F 9/50*     (2006.01)

(52) U.S. Cl.
CPC .............. *G06F 9/466* (2013.01); *G06F 9/5033* (2013.01); *G06F 11/2033* (2013.01)

(58) Field of Classification Search
None
See application file for complete search history.

(56) References Cited

U.S. PATENT DOCUMENTS 6,101,527 A    8/2000   Lejeune et al.
7,386,849 B2 *  6/2008   Dageville et al. ............. 718/102
(Continued)

FOREIGN PATENT DOCUMENTS

CN    1482781 A    3/2004
CN    1959641 A    5/2007
(Continued)

OTHER PUBLICATIONS

Rahm, E., "A Framework for Workload Allocation in Distributed Transaction Processing Systems," Journal of Systems & Software, vol. 18, No. 2, May 1, 1992, pp. 171-190.
(Continued)

*Primary Examiner* — Tammy Lee
(74) *Attorney, Agent, or Firm* — Cuenot, Forsythe & Kim, LLC

(57) ABSTRACT

A workload manager is operable with a distributed transaction processor having a plurality of processing regions and comprises: a transaction initiator region for initiating a transaction; a transaction router component for routing an initiated transaction to one of the plurality of processing regions; an affinity controller component for restricting transaction routing operations to maintain affinities; the affinity controller component characterised in comprising a unit of work affinity component operable with a resource manager at the one of the plurality of processing regions to activate an affinity responsive to completion of a recoverable data operation at the one of the plurality of processing regions.

1 Claim, 4 Drawing Sheets

(56) References Cited

U.S. PATENT DOCUMENTS

| | | | |
|---|---|---|---|
| 8,315,992 B1* | 11/2012 | Gipp et al. | 707/692 |
| 2002/0087366 A1 | 7/2002 | Collier et al. | |
| 2002/0143965 A1* | 10/2002 | Aiken, Jr. | 709/229 |
| 2005/0050202 A1* | 3/2005 | Aiken et al. | 709/227 |
| 2006/0085588 A1 | 4/2006 | Rajwar et al. | |
| 2007/0043726 A1* | 2/2007 | Chan et al. | 707/9 |
| 2007/0256081 A1* | 11/2007 | Comer | 719/316 |
| 2009/0034537 A1* | 2/2009 | Colrain et al. | 370/400 |
| 2010/0228927 A1* | 9/2010 | Levanoni | 711/154 |

FOREIGN PATENT DOCUMENTS

| | | | |
|---|---|---|---|
| CN | 102713850 A | | 10/2012 |
| DE | 112010004530 T5 | | 8/2012 |
| EP | 0843259 A1 | | 5/1998 |
| GB | 2489080 A | | 9/2012 |
| WO | 2011083056 A2 | | 7/2011 |

OTHER PUBLICATIONS

Ohn, K., et al., "Prototyping PHLOX, a High Performance Transaction Processing System on a Workstation Cluster With Shared Disks," Proc. of 8th IEEE Workshop on Future Trends of Distributed Computing Systems, FTDCS 2001, Jan. 1, 2001, pp. 67-73.

Yu, P.S., et al., "Analysis of affinity based routing in multi-system data sharing," Performance Evaluation, vol. 7, No. 2, Jun. 1987, pp. 87-109, retrieved from the Internet: sciencedirect.com/science/article/pii/0166531687900253>, 1 pg.

CN Appln. No. 201080061080.1, Office Action, Aug. 1, 2014, 6 pg.

WIPO Int'l. Appln. No. PCT/EP2010/070631, International Search Report, 4 pages, Aug. 22, 2011.

WIPO Int'l. Appln. No. PCT/EP2010/070631, Written Opinion, Jul. 11, 2012, 6 pg.

* cited by examiner

TRANSACTIONAL UPDATING IN DYNAMIC DISTRIBUTED WORKLOADS

CROSS-REFERENCE TO RELATED APPLICATIONS

This application is the national stage of PCT/EP2010/070631 filed Dec. 23, 2010, designating, inter alia, the United States and claiming priority to European Patent Application having Patent Application No. 10150461.1 filed Jan. 11, 2010, each of which is hereby incorporated by reference.

BACKGROUND

The concept of dynamic workload management of user applications has been known in the art for many years. Fundamentally, it consists of identifying where individual pieces of work should be dispatched-to from a candidate set of servers based upon server state, an appropriate routing algorithm and any relevant affinity data. Candidate sets are usually defined via administrative dialogs related to user applications. Routing algorithms are typically throughput or response time based. Affinities refer to data that the application references in the target server, which needs to be subsequently accessed, thus impeding the ability to dynamically route work whilst the affinity is active.

Distributing applications has the advantage that, should an individual server fail, only those currently executing tasks on that server are affected; user tasks on other servers are unaffected, thus reducing the impact of the failure on application availability. Users executing work on the failed server must manually restart their transactions, and the transactions must be routed to another (active) candidate for the application to execute.

Such solutions provide increased availability of applications to end users whilst the availability of the underlying individual servers may change. They also can improve throughput and application response times smoothing the effects across multiple address spaces.

One implementation of a dynamic workload management system, for IBM's CICS® Transaction Server, is provided by the CICSPlex SM Workload Management (WLM) component. This component is invoked by CICS at suitable points in processing requests to identify the target region for the request, and to manage application affinities. (CICS is a trademark of IBM Corporation, registered in many jurisdictions).

Dynamic workload distribution schemes can further be complicated by the effects of parts of the work being included in what is known in the art of transaction processing as a Unit Of Work (UOW). The concept of transactional units of work is well known to those of ordinary skill in the transaction processing art, and thus needs no further description here. Examples considered in the present description relate to IBM's DB2® database records and IBM's VSAM records accessed in the target regions, but it will be clear to one of ordinary skill in the art that the same considerations apply to records or other data controlled using other resource management systems that are capable of interacting with a transaction processing system. (DB2 is a trademark of IBM Corporation, registered in many jurisdictions).

When a unit of work is distributed across multiple servers, a recovery manager must make a note of any server within the unit of work that has performed recoverable work on its behalf. This information is used at successful completion (syncpoint commit) to commit those pieces of work in the servers, or to back out the changes (syncpoint rollback) should the application request it, should the task terminate abnormally (abend), or should the region terminate abnormally (at region restart). As is known to those of skill in the art, the more distributed the unit of work, the more processing is required and the greater is the risk of a component not being available. It is further well known that multiple requests for the same record within a unit of work must be within the same server region, otherwise a deadlock occurs, and that applications that will request the same record outside that unit of work, when a retained lock exists (caused by either a task abend or a server abend), will not be able to execute.

Also, once a target region has been selected for a piece of work with a declared affinity, the affinity is bound and subsequent requests will be routed to that region, regardless of whether any recoverable work has been done in the target region. This is particularly disadvantageous to processing efficiency when the target region rejects the request, unnecessarily reducing application availability, and causing unnecessary backouts when a chain of distributed program links (DPLs) is involved and one program in the chain abends.

It is desirable to address these shortcomings of known transaction processing systems wherein the conflicting needs for transactional control of dynamically-routed work requests and affinity management of the work requests cannot be reconciled other than partially, and by means of expensive and potentially error-prone application and system redesign.

BRIEF SUMMARY

The present invention accordingly provides, in a first aspect, workload manager operable with a distributed transaction processor having a plurality of processing regions and comprising: a transaction initiator region for initiating a transaction; a transaction router component for routing an initiated transaction to one of said plurality of processing regions; an affinity controller component for restricting transaction routing operations to maintain affinities; said affinity controller component characterised in comprising a unit of work affinity component operable with a resource manager at said one of said plurality of processing regions to activate an affinity responsive to completion of a recoverable data operation at said one of said plurality of processing regions.

In a second aspect, there is provided a method for operating a workload manager with a distributed transaction processor having a plurality of processing regions and comprising: initiating a transaction by a transaction initiator region; routing an initiated transaction by a transaction router component to one of said plurality of processing regions; restricting transaction routing operations by an affinity controller component to maintain affinities; the method characterised in comprising operating unit of work affinity component with a resource manager at said one of said plurality of processing regions to activate an affinity responsive to completion of a recoverable data operation at said one of said plurality of processing regions.

In a third aspect, there is provided a computer program comprising computer program code to, when loaded into a computer system and executed thereon, cause said computer system to perform all the steps of the method according to the second aspect.

BRIEF DESCRIPTION OF THE SEVERAL VIEWS OF THE DRAWINGS

A preferred embodiment of the present invention will now be described by way of example only, with reference to the accompanying drawings, in which.

DETAILED DESCRIPTION

One or more aspects of the present invention relate to the control of dynamic distributed workloads in transaction processing systems, and more particularly to the provision of improved control of such workloads where transactions are affected by transactional affinities.

As described in the Background, dynamic routing of requests in a transactional environment with known techniques for affinity management can cause application deadlocks and excessive distribution of syncpoint flows.

This occurs because, in the known art embodiments of affinity management, the affinity must be declared to the system prior to any activity that might modify the recoverable resources that are subject to the need for the affinity actually having taken place.

In its broadest application, a preferred embodiment of the present invention provides a Unit Of Work affinity control component operable with the transaction processor dynamic routing logic to address these shortcomings of the known art.

Preferred embodiments of the present invention address these shortcomings by providing a "provisional" declaration of an affinity between a UOW and a server that owns the resources, but not "activating" the affinity until a recoverable modification to a resource has taken place.

Thus, in the preferred embodiment, dynamic routing to provide server allocation is available the first time a routing request is performed (RouteSelect). Once recoverable work has been done (recorded by recovery manager—CreateAffinity), subsequent routing requests will be directed to the same server (Affinity active) until the UOW is either committed or backed out (Destroy affinity). For the purposes of illustrating the main idea, the following description treats this affinity as if it were a declared affinity according to the art.

Should no recoverable work have been done in the target region, then a further transaction having the same "provisional" affinity can be dynamically routed to an alternative region to perform its part of the processing without user intervention, because the affinity is not "fixed" as in the prior art. This reduces the potential effects of conventional affinity management on the performance of the system as perceived by the end user by automatically retrying routing to an alternate server when no recoverable work has been performed at the target.

Upon first dynamic routing request (routeSelect), upon successful route, record that fact for this unit of work (in the resource manager). Subsequent routing requests will be directed to that region, until commit/backout processing, thereby preventing deadlocks. Typical examples today include VSAM and DB2 record locks.

Figure 1A:
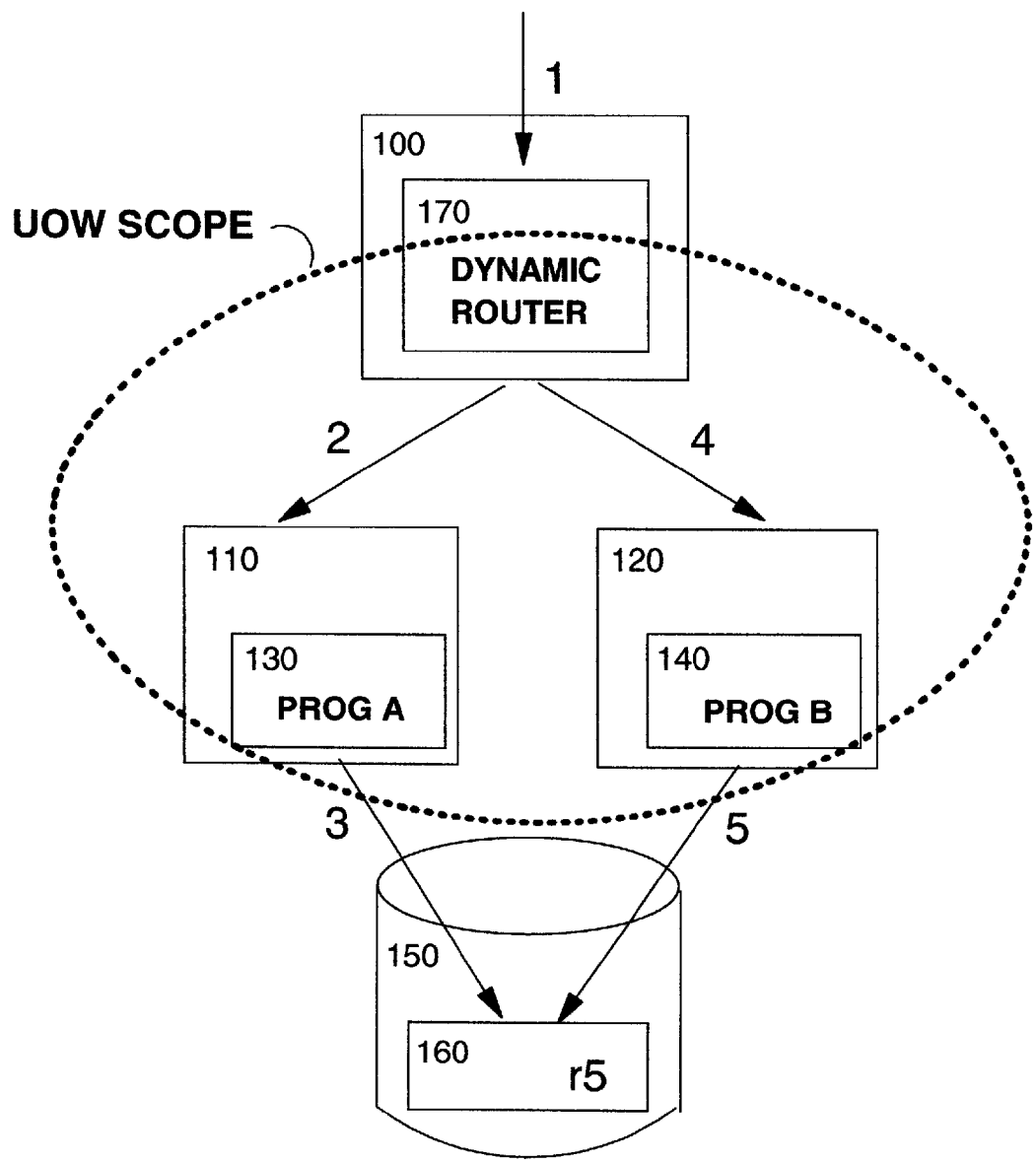
FIG. 1A shows the operation of a system according to the prior art.
Figure 1B:
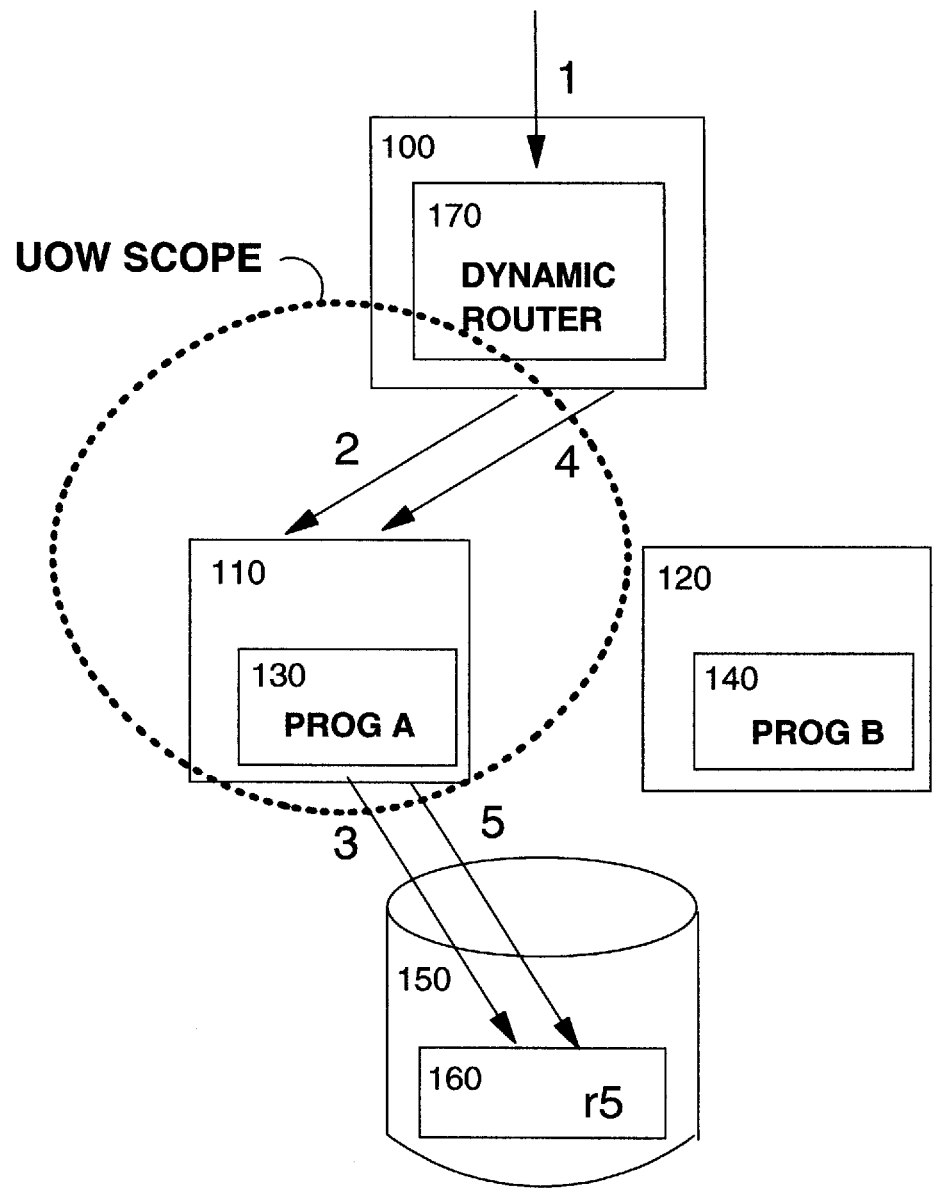
FIG. 1B shows further operation of a system according to the prior art.

Turning to FIG. 1A, there is shown an arrangement of transaction processing components according to the art comprising a first system or region 100 arranged for receiving an inbound request for work and having a dynamic routing component 170 arranged to route work to further systems or regions 110, 120 for processing by programs (exemplary programs named PROG A and PROG B, in the Figure) 130, 140. Programs 130, 140 are operable to access a resource, for example, data resource 150, which comprises an exemplary data record (called r5 in the Figure) 160. As will be clear to one of ordinary skill in the art, inbound requests for transactional work cause the initiation of a UOW, which has a scope shown by the broken-line enclosure marked UOW SCOPE. In an exemplary flow, inbound request 1 causes dynamic routing flow 2 to route the request to program 130 (PROG A) at system or region 130. At flow 3, PROG A accesses resource r5 160 at data resource 150. At flow 4, a further dynamic routing flow occurs to program 140 (PROG B) at system or region 120. At flow 5, PROG B attempts to access resource r5 160 at data resource 150. A deadlock ensues. It is to prevent such occurrences that the system of affinity management as shown in FIG. 1B was developed, Turning now to FIG. 1B, inbound request 1 causes dynamic routing flow 2 to route the request to program 130 (PROG A) at system or region 130. At flow 3, PROG A accesses resource r5 160 at data resource 150. An affinity exists, so that at flow 4, a further work request is constrained to invoke program 130 (PROG A) at system or region 110. At flow 5, PROG A accesses resource r5 160 at data resource 150. Advantageously, the locks on resource r5 160 are local and thus no deadlock occurs. Disadvantageously, however, the affinity has restricted the system's freedom to route work and thus reduced the system's processing efficiency.

In a preferred embodiment of the present invention, then, a new form of affinity is defined. Like any other affinity, it is declared to exist, but it is not made effective until the first recoverable work has been done by the transaction. The following exemplary pseudocode illustrates the procedure with reference to the CICS and CICSPlex SM products, but it will be clear to one of ordinary skill in the art that the invention may be embodied in many other transactional environments, including, for example, database transaction systems and online transaction processing systems:

| CICSPlex SM |
|---|
| Select(routingType) |
|   When (routeSelect) |
|     If DeclaredAffinity then |
|       If AffinityActive then |
|         GetAffinity |
|         RouteToTarget |
|       Else |
|         SelectTarget |
|         CreateAffinity |
|         RouteToTarget |
|     Else |
|       SelectTarget |
|       RouteToTarget |
| ... |
| ... |
| CreateAffinity: proc |
|   If DeclaredAffinity = UOW then |
|     NotifyRMUOWAffinity(Target) |
| .. |
| .. |
| End |

| CICSRouting: |
|---|
| If Dynamic = YES then |
|   If UOWAFFINITY then |
|     InvokeRouteStatic (Target) |
|   Else |
|     InvokeRouteSelect |

```
UOWProcessing:

CommitComplete:
    If UOWAffinity then
        UOWAFFINITY = false
    End
```

As will be clear to one of skill in the art, embodiments of the invention are particularly advantageous in allowing the system to make use of the circumstance in which no recoverable work has been done to respond to a route reject or failure by automatically selecting another target region without user intervention.

Figure 2A:
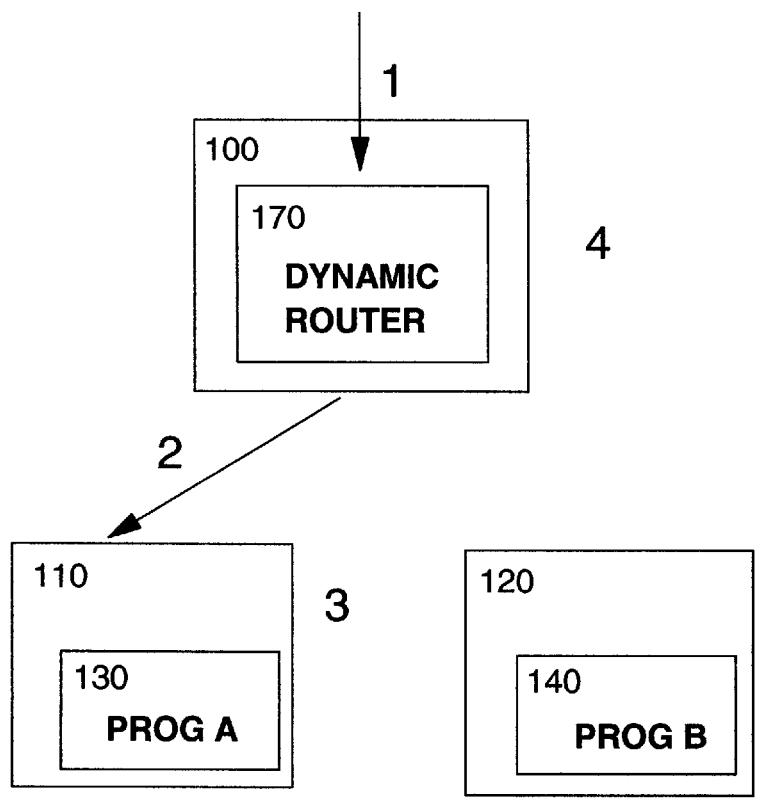
FIG. 2A shows yet further operation of a system according to the prior art.

In FIG. 2A, inbound request 1 causes dynamic routing flow 2 to PROG A 130 at system or region 110. The routing request is rejected or there is an abnormal termination at 3, and at 4 the request fails. In systems according to the art, a manual restart to redirect the routing action to avoid the affinity would be required. Otherwise, the affinity would cause repeated retries using the same (failing) route.

Figure 2B:
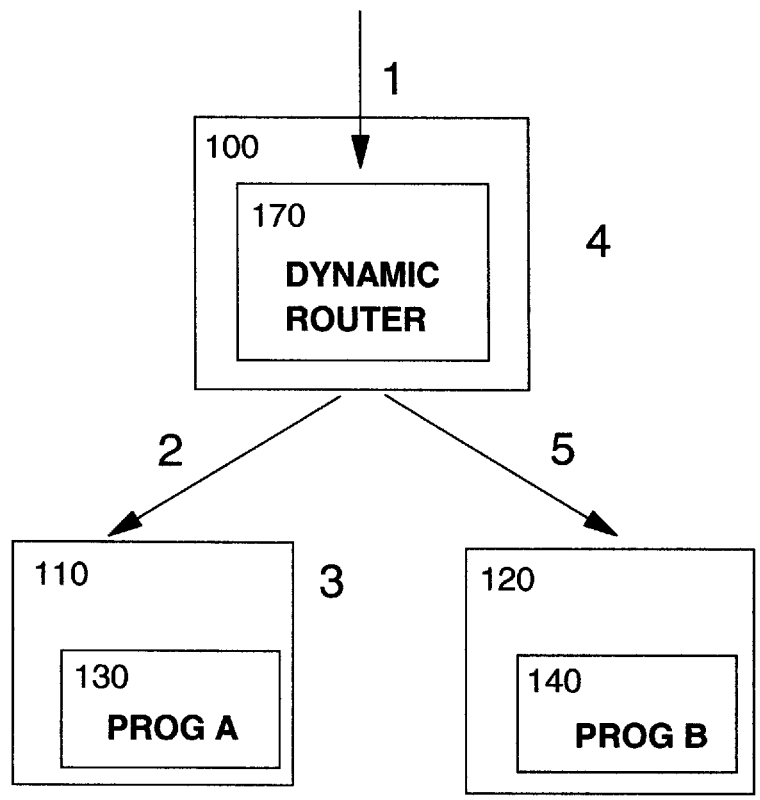
FIG. 2B shows the operation of a system according to a preferred embodiment of the present invention.

By contrast, as shown in FIG. 2B, a system according to the preferred embodiment responds to the route rejection or abnormal termination at 3 by performing a test at 4 to determine whether the UOW affinity has been activated by the performance of recoverable work. If the UOW affinity has not been activated, the system is free to route the work at 5 to PROG B 140 at system or region 120, and processing of the work can proceed.

The following exemplary pseudocode illustrates the procedure with reference to the CICS and CICSPlex SM products, but it will be clear to one of ordinary skill in the art that the invention may be embodied in many other transactional environments, including, for example, database transaction systems and online transaction processing systems:

```
CICSPlex SM Routing

Select(routingType)
    When (routeSelect)
    SelectTarget
    RouteToTarget
    When routeReject or (routeAbend and NoWorkDone) then
    SelectTarget
    RouteToTarget
    ...
```

```
CICSRouting:

if Abend then
If recoverableWork then InvokeRouteAbend (NoWorkdone = false)
Else InvokeRouteAbend (NoWorkDone = true)
```

It will be readily appreciated by one of ordinary skill in the art that various further modifications to the embodiment described above will be apparent to a person of ordinary skill in the art.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

The present invention accordingly provides, in a first aspect, workload manager operable with a distributed transaction processor having a plurality of processing regions and comprising: a transaction initiator region for initiating a transaction; a transaction router component for routing an initiated transaction to one of said plurality of processing regions; an affinity controller component for restricting transaction routing operations to maintain affinities; said affinity controller component characterised in comprising a unit of work affinity component operable with a resource manager at said one of said plurality of processing regions to activate an affinity responsive to completion of a recoverable data operation at said one of said plurality of processing regions.

Preferably, said unit of work affinity component is further operable to permit said transaction router component to reroute a transaction to a different one of said plurality of processing regions responsive to an indication of lack of completion of a recoverable data operation at said one of said plurality of processing regions. Preferably, said lack of completion of a recoverable data operation at said one of said plurality of processing regions is associated with a routing rejection or an abnormal transaction termination. Preferably, said distributed transaction processor comprises an online transaction processing system. Preferably, said distributed transaction processor comprises a transactional database system.

In a second aspect, there is provided a method for operating a workload manager with a distributed transaction processor having a plurality of processing regions and comprising: initiating a transaction by a transaction initiator region; routing an initiated transaction by a transaction router component to one of said plurality of processing regions; restricting transaction routing operations by an affinity controller component to maintain affinities; the method characterised in comprising operating unit of work affinity component with a resource manager at said one of said plurality of processing regions to activate an affinity responsive to completion of a recoverable data operation at said one of said plurality of processing regions.

The method preferably further comprises operating said unit of work affinity component to permit rerouting a transaction to a different one of said plurality of processing regions responsive to an indication of lack of completion of a recoverable data operation at said one of said plurality of processing regions. Preferably, said lack of completion of a recoverable data operation at said one of said plurality of processing regions is associated with a routing rejection or an abnormal transaction termination. Preferably, said distributed transaction processor comprises an online transaction processing system. Preferably, said distributed transaction processor comprises a transactional database system.

In a third aspect, there is provided a computer program comprising computer program code to, when loaded into a computer system and executed thereon, cause said computer system to perform all the steps of the method according to the second aspect.

The invention claimed is:

1. A method of operating a workload manager with a distributed transaction processor having a plurality of regions, comprising:
   initiating a transaction;
   routing the initiated transaction to one of the plurality of processing regions;
   declaring a provisional affinity between a unit of work for the initiated transaction and the processing region to which the initiated transaction is routed;
   performing, by the processing region to which the initiated transaction is routed, a recoverable data operation;
   activating, based upon completion of the recoverable data operation, the provisional affinity;
   wherein the recoverable data operation is a recoverable modification to a resource accessed by the processing region to which the initiated transaction is routed; and
   routing, prior to the recoverable data operation being perform, a second transaction having a same provisional affinity to an alternative one of the plurality of processing regions.

* * * * *